June 12, 1934. L. C. SMITH 1,962,621

BEVERAGE COOLER

Filed Jan. 4, 1933

Inventor
Lawrence C. Smith
By Albert R Henry
Attorney

Patented June 12, 1934

1,962,621

UNITED STATES PATENT OFFICE 1,962,621

BEVERAGE COOLER

Lawrence C. Smith, Kenmore, N. Y., assignor to Fedders Manufacturing Company, Inc., Buffalo, N. Y.

Application January 4, 1933, Serial No. 650,119

2 Claims. (Cl. 62—95)

This invention relates to beverage coolers, and it has particular reference to apparatus for effectively cooling a stream of liquid subject to intermittent and variable rates of flow.

In the cooling of liquids, such as water supplied from a service main, or carbonated beverage contained in a barrel, the objects sought are the maintenance of a certain temperature or temperature range for the liquid, high capacity or permissible discharge rate within such range, and freedom from overheating or freezing during abnormal periods of use or quiescence. These objects have been found difficult of attainment in apparatus which, by virtue of simplicity, size, and cost, is practical for ordinary uses. The present invention aims to provide apparatus which is of simple design, effective in operation, and which may be made at a low cost and which also occupies a minimum of space, and which apparatus achieves the desired criteria in liquid cooling.

To cool the liquid to the desired temperature range, without, however, injecting a tendency to over-cool or freeze such liquid during periods of quiescence, the present invention utilizes a brine tank, in which there is immersed a cooling coil, through which the treated liquid may flow. This coil is made of such length, with respect to its diameter, as to present an adequate surface for cooling any quantity of liquid which may be passed through it under the pressures usually met in service, such as the pressure on water service lines or in a barrel of carbonated beverage. The temperature of the brine is regulated to establish a low temperature point for the treated liquid, and one above the freezing point, while the length of the coil insures the cooling of whatever quantity may be passed through the coil.

In order to adapt this principle of cooling in an effective manner to the ends in view, the invention conjointly provides for the cooling of the brine by means of an expansible liquid refrigerant, which is thermally juxtaposed to the brine, and which is permitted to expand and effect its cooling function by operation through a mechanical refrigerating system. The means whereby these features may be applied in practice are illustrated in one form in the accompanying drawing, wherein.

Figure 1:
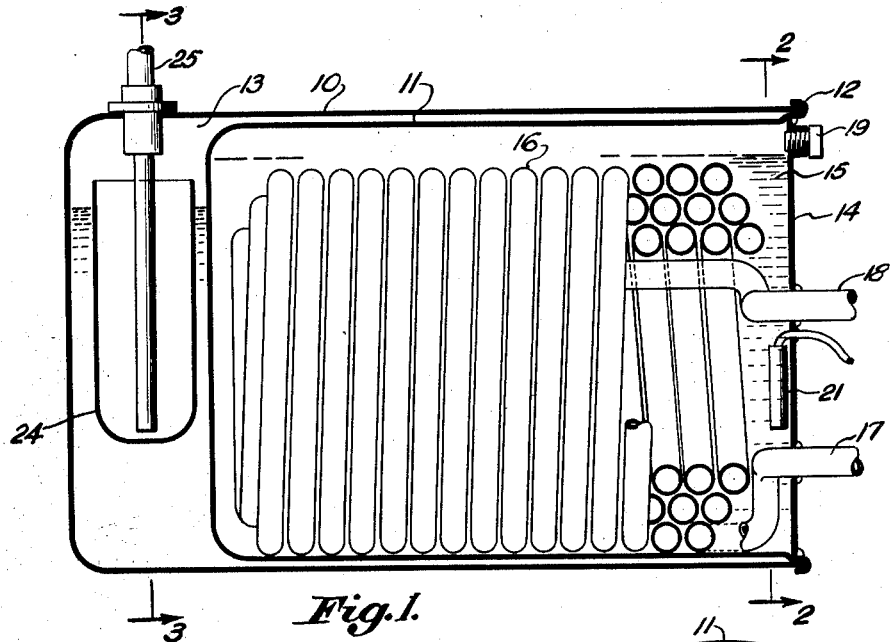
Fig. 1 is a longitudinal cross-section through a cooling apparatus embodying the invention.
Figure 2:
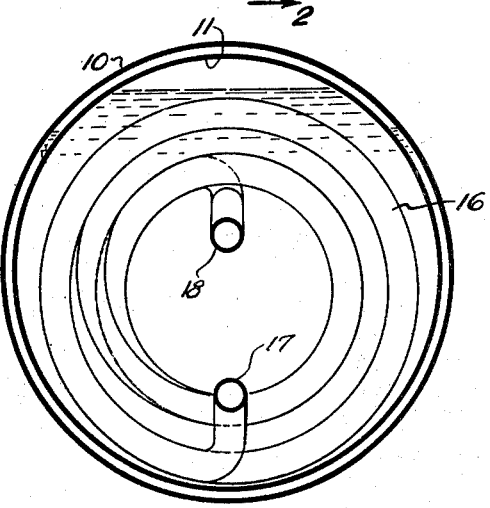
Fig. 2 is a transverse section on the line 2—2 of Fig. 1.
Figure 3:
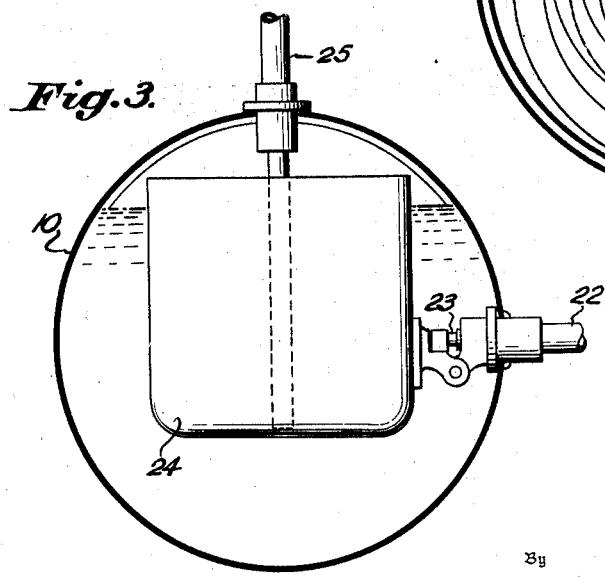
Fig. 3 is a transverse section on the line 3—3.

The apparatus comprises a pair of cup-shaped members or headers, 10 and 11, which are slightly spaced from each other and are joined at their outer ends, as indicated by the numeral 12, to form a chamber 13, adapted to contain liquid refrigerant, which embraces the inner header 11. The open end of the header 11 is closed by a plate 14, to form a second chamber 15, in which is placed a quantity of brine. It will thus be seen that, by virtue of the good thermal contact between the refrigerant chamber 13 and the brine chamber 15, obtaining through the metal wall of the member 11, the brine may be held at a low temperature at all times, without being materially affected by the thermal demands made on the brine.

Within the chamber 15 is a coil of pipe 16, formed by bending suitable tubing, such as block tin pipe, into a helix, the ends 17 and 18 of which project through the end plate 14 to serve as inlet and outlet ends for the liquid to be cooled. It will be noted that the pipe 16 is of uniform diameter, and is quite long. Thus, if the cylinder 11 be about 7 inches diameter by about 12 inches in length, a hundred feet of three-eighths inch tubing may be formed in a coil to be placed in the cylinder. Such pipe, being free from internal restrictions, does not affect the fluid pressure in the pipe, as would be the case otherwise, and it will be recognized that this is a feature of advantage, particularly in dealing with carbonated beverages.

The space around the coil 16, in the chamber 15, is filled with brine, which may be added through the opening 19 in the end plate 14. A thermostat 21 is also placed in the chamber 15, and it is intended to control the operation of the mechanical refrigeration system, in a manner well known in the art.

The refrigerant, in the outer chamber 13, is admitted thereto through a supply pipe 22 disposed in the cylinder 10, which is intended to lead from the condenser or receiver of a compressor-condenser-expander type of mechanical refrigeration apparatus. Liquid entering the pipe 22 passes a control valve 23, whose position is affected by a float 24, serving to maintain a predetermined liquid level in the chamber 13. The float shown is of the open or bucket type, and gasified refrigerant, entering the cavity of the float, is returned to the compressor through a suction pipe 25, disposed in the cylinder 10.

It will be understood that, in operation, the circuit through the compressor, condenser, and chamber 13, operates in the usual manner for a mechanical refrigerator. As the liquid refrigerant evaporates, cooling of the brine in the cylinder 11 is effected, and the cooled brine in turn absorbs heat from liquid contained in the coil 16. The thermostat 21 is responsive to temperature changes in the brine, and it is so adjusted that, when the brine reaches a predetermined low temperature, the refrigeration cycle through the compressor is interrupted, while, when a predetermined high temperature is reached, the refrigerant is circulated through the chamber 13. It will thus be seen that while the liquid to be cooled is shielded from the volatile refrigerant, through the interposition of the brine chamber, the operation of the refrigerant cycle is made dependent upon the demands exerted by the said liquid. In this manner, the treated liquid is held within the desired temperature limits, without being subject to great danger of over-cooling.

It will further be noted that the apparatus is compact in form and simple in construction, and that it may be applied readily to existing structures, as well as specially designed cabinets or equipment.

I claim:

1. Liquid cooling apparatus comprising a pair of nested cylindrical headers closed at one end and connected to each other at the opposite ends to form a refrigerant chamber therebetween, means for admitting liquid refrigerant to said chamber to contact with the wall of the inner of said headers, a cooling coil disposed in said inner header, a body of brine in said inner header and around said coil and in thermal contact therewith, and a thermostat in said brine for controlling the operation of the refrigerant.

2. Liquid cooling apparatus comprising a pair of cylindrical headers each having a closed end and disposed one within the other in slightly spaced relation, said headers being mutually joined at their open ends to form therebetween a chamber for liquid refrigerant, means connected to the outer of said headers for admitting and withdrawing refrigerant to said chamber, a cover plate for the open end of said inner header, a liquid coil disposed in said inner header and having its ends projecting through said plate, a filling opening for brine in said plate, and a thermostat for controlling the refrigerant circulation disposed in said inner header.

LAWRENCE C. SMITH.